May 8, 1962     J. M. PEARRING     3,033,596
CABLE-PASSING SWIVEL
Filed May 9, 1960
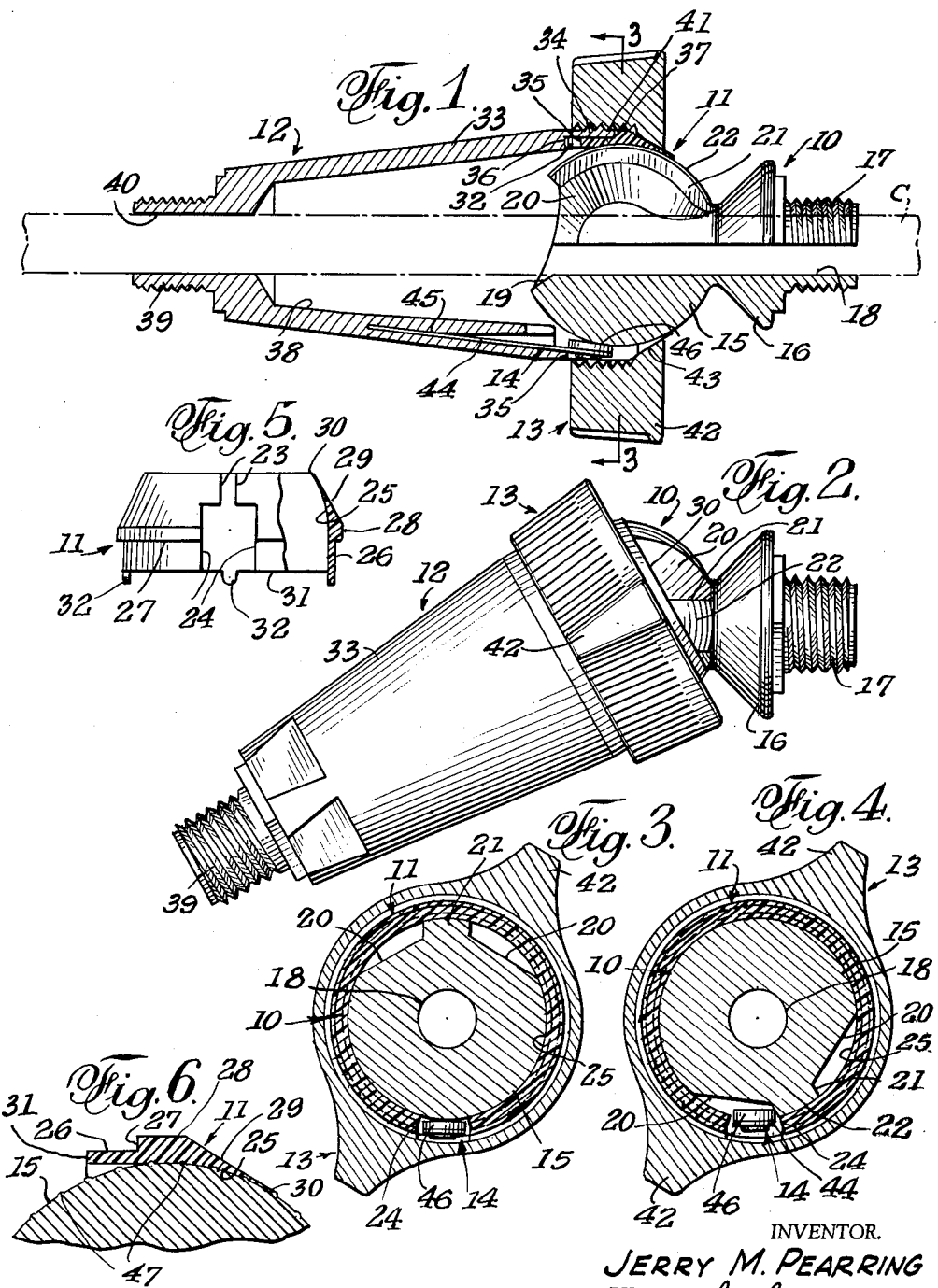
INVENTOR.
JERRY M. PEARRING
BY C. G. Stratton
ATTORNEY United States Patent Office 3,033,596
Patented May 8, 1962

3,033,596
CABLE-PASSING SWIVEL
Jerry M. Pearring, 2116 S. Santa Anita, Arcadia, Calif.
Filed May 9, 1960, Ser. No. 27,681
10 Claims. (Cl. 285—261)

This invention relates to a swivel through which covered electric wires or cables are passed, the invention having for an object to obviate wear and breakage of a wire cable such as may be caused by excessive twisting thereof in use. Frequent bending, particularly at the same point, and excessive twisting are major causes of failure of exposed electric cables, a fault the present swivel seeks to eliminate. This application is a continuation-in-part of my pending application, Serial Number 729,688, filed April 21, 1958, now abandoned.

Another object of the present invention is to provide a swivel of the character referred to that has improved frictional engagement between the swivel elements of the construction to hold the relationship of said elements and yet enabling facile relative adjustment.

Another object of the invention is to provide a swivel, as indicated, that in addition to limiting swiveling twist, also limits bending of the electrical wire cable passed therethrough.

A further object of the invention is to provide a swivel that is non-locking in that a resilient stop is provided, the same allowing swiveling movement to the limits of the device.

A still further object of the invention is to provide a swivel that is constructed to resist separation of the swivel components.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, and which is based on the accompanying drawing. However, said drawing merely shows, and the following description merely describes, preferred embodiments of the present invention, which are given by way of illustration or example only.

In the drawing, like reference characters designate similar parts in the several views.

FIG. 1 is a longitudinal sectional view of a swivel according to the present invention with the parts thereof in straight alignment.

FIG. 2 is a side elevational view showing the swivel components bent at an angle to each other and the parts relatively rotated.

FIG. 3 is a cross-sectional view as taken on the line 3—3 of FIG. 1.

FIG. 4 is a similar view showing one stop limit position of the swivel.

FIG. 5 is a side view, partly in section, of a non-metallic bushing used in the structure.

FIG. 6 is a fragmentary and enlarged cross-sectional view of a modification.

The swivel that is illustrated comprises, generally, a swivel ball component 10, a bushing 11 around the component 10, a body swivel component 12 embodying a socket for the bushing 11 and, therefore, for the component 10, a locking ring or nut 13 engaged with the body component to hold the swivel components 10 and 12 against endwise separation and to apply constricting pressure on the bushing 11, and a resilient stop 14 carried by the component 12 and constituting a rotation-limiting means that limits relative rotation of the swivel components 10 and 12.

The ball component 10 comprises a metal member that has a spherical part or ball 15, an extension 16 from said ball, and an externally threaded end shank 17 extending in line with the extension 16. A bore 18 of a size to freely pass an electric wire cable C extends axially through the component 10. While shown as a straight bore, the bore 18 may be flared toward the inner end of the component and, as shown, said end may be countersunk, as at 19. It will be evident that considerable bending of a cable C may take place at or beyond the countersunk end of the ball 15 and that such bending will be gradual rather than abrupt and attritive. This is particularly so when the bore 18 is flared or tapered as described above.

The spherical part or ball 15 is truly spherical for somewhat more than half its surface. The other half of the ball is relieved at 20, on both sides, to define a rib 21 which has its outer face 22 as a continuation of the spherical surface of the ball. Thus, the relieved portions 20 are under-flush with respect to the face 22 of rib 21. Said rib 21 extends longitudinally of the component 10. Because of the sides defined between the relief portions 20 and the rib, the latter constitutes a fixed rotational stop for any element that is rotationally engaged with the ball.

The bushing 11 is non-metallic, preferably nylon, and substantially girdles the ball 15. Said bushing is shown as a split ring that is split between the edges 23 and between further separated edges 24. Said bushing has an internal spherical face 25 of a size to fit over the ball 15 and conform to the spherical curvature thereof. The outside of the bushing is formed to have a cylindrical face 26, an annular shoulder 27 at the inner end of face 26, a larger cylindrical face 28 extending from said shoulder, and a conically tapered face 29 that extends from face 28 and terminates in a sharp edge 30 where the same joins the internal spherical face 25. The end edge 31 of the bushing is provided with projections 32. As seen in FIG. 1, the bushing above described is adapted to be placed on the ball 15 with the edge 30 directed toward the extension 16 of the ball component. Thus, the shoulder 27 and the projections 32 are directed toward the inner end of the ball 15 of the component 10.

The body component 12 comprises a metallic member formed to have a conical housing 33 in the large end of which is formed an annular seat 34 that is defined by an annular shoulder 35 in which are formed recesses 36. It will be seen that the bushing 11 is adapted to fit in seat 34 with the shoulder 27 seated against the end face 37 of the housing 33 and the projections 32 entered in the recesses 36 to hold the bushing non-rotationally connected with the body component. Thus, the bushing 11 constitutes a non-metallic extension of the component 12, an extension that is resilient and capable of being constricted around the ball 15.

The housing 33 has a relatively large inner bore 38 that preferably follows the taper of the housing. The latter, at its small end is provided with an externally threaded shank 39 that has a bore 40 similar to the bore 18 of the shank 17. A cable C is freely fitted in bore 40 and extends, with large clearance, through the bore 38 to and through the bore 18.

External threads 41 are provided on the large end of the housing 33, the same being engageable by the internal threads of ring or nut 13. Said ring is here shown with diametrally opposed wings 42 so that the same may be taken up on the component 12 by finger manipulation. Beyond the threads in the ring, the same is formed with a conically tapered seat 43 that engages the conical face 29 of the bushing to cause the mentioned constricting of the bushing around the spherical face of the ball 15. Since the bushing is elastic, it will be realized that the locking nut 13 will compress the same and create a resilient reaction between the threads of the component 12 and those of the ring. Therefore, the bushing not only creates desired friction between the swivel components, the same also obviates or inhibits backing off of the ring at its threaded connection.

The engagement of the projections 32 of the bushing 11 in the recesses 36 of the swivel component 12 so aligns these two elements that the stop 14 operates in the gap in the bushing 11 that is formed between the edges 24 thereof. This stop comprises a flat spring finger 44 that is anchored in a seat 45 formed longitudinally in the wall of the housing 33. Said finger is biased inwardly toward the axis of the housing and has on its free end a disc 46 that has a flat face directed toward the ball 15. As seen in FIGS. 1 and 3, the bias of spring finger 44 causes the disc to firmly impinge on the outer faces of the ball regardless whether the same are the spherical faces or the relief faces 20. Therefore, the two swivel components may be relatively moved and relatively turned as limited by the engagement of extension 16 of the ball component with the lock ring 13, and as limited by the stop disc 46 with one side or the other of the rib 21. Since the two swivel components cannot be axially relatively rotated, except to the limited degree above indicated, there is but little possibility that forces will be generated to cause undesired back-off of the resiliently tightened locking ring.

The frictional engagement between the bushing and the ball 15 may be increased by the provision on the spherical surface of said ball of a multiplicity of small protuberances or knobs 47 which press into the spherical face 25 of the bushing.

In the above manner, a non-binding swivel has been provided for the intended purpose, the same limiting wire cable twist and the attending wear, and also assuring bending of the cable without breakage.

It will be realized that the smaller the ball, the smaller is the bending arc of the parts. By forming the housing with a taper, as shown, the same may be provided with a large socket or seat for a large ball, thereby providing swivel enabling bends as great as 60° from an aligned position.

While the foregoing has illustrated and described what is now contemplated to be the best mode of carrying out the invention, the constructions are, of course, subject to modification without departing from the spirit and scope of the invention. Therefore, it is not desired to restrict the invention to the particular forms of construction illustrated and described, but to cover all modifications that may fall within the scope of the appended claims.

Having thus described the invention, what is claimed and desired to be secured by Letters Patent is:

1. A swivel comprising a metal member having a ball spherical for approximately half its surface and provided with a rib disposed on the ball in a manner substantially parallel to the longitudinal axis of the swivel when the ends of said swivel are in alignment and diametrally opposite to the spherical portion of said surface and defined between two relieved surfaces, a split elastic non-metalic bushing encircling said ball and having a spherical seat conforming to the spherical portion of the ball, a metal housing member having an end seat for the bushing, a resilient stop carried by said housing member and having an end biased in a direction to engage the spherical and relieved surfaces of the ball and disposed in the split in the bushing, a nut to threadedly engage the housing member to draw the bushing tightly into its seat and in constricted frictional engagement with the spherical surface of the ball, said stop when freed by relieved surfaces flexing inwardly into stop engagement with the rib on the ball to limit relative rotation of the metal members to limit twisting of a wire cable extending through the members.

2. A swivel according to claim 1 in which the bushing and housing members are provided with interengaged means to lock the same against relative rotation.

3. A swivel according to claim 1 in which the bushing has an outer conical face and the nut has an inner conical seat that engage, when the nut is turned, to force the bushing into the mentioned frictional engagement with the ball.

4. A swivel according to claim 2 in which the spherical surface of the ball is provided with a multiplicity of protuberances that press into the spherical seat of the bushing to increase the degree of frictional engagement of the ball and bushing.

5. In combination, two metal members, one having a ball with a rotation-limiting stop rib disposed on the ball in a manner substantially parallel to the longitudinal axis defined by the two metal members when said members are in alignment and the other having an end seat, a non-metallic and elastic split bushing disposed in said seat and having a spherical seat in which the ball is disposed, a resilient stop carried by the member that has the end seat and biased in a direction to engage the spherical surface of the ball past the bushing and adapted to engage the stop rib of the other member to limit relative rotation of the metal members, and a nut on said seat-provided metal member and in constricting engagement with the bushing to impose frictional resistance to relative rotation of the two metal members.

6. The combination according to claim 5 including means interengaging the bushing and the member in which the bushing is disposed to lock the same against relative rotation.

7. The combination according to claim 6 including interengaging conical surfaces on the bushing and nut that cause compression of the bushing by the nut during constriction of the bushing around the ball.

8. The combination according to claim 6 including interengaging conical surfaces on the bushing and nut that cause compression of the bushing by the nut during constriction of the bushing around the ball, and protuberances on the ball in compression engagement with the seat of the bushing.

9. A swivel comprising a first member having a spherical surface provided with a rib defined between two relieved portions of said surface and disposed in a manner substantially parallel to the longitudinal axis of the swivel when the ends of said swivel are in alignment, a metal housing member having a spherical seat for receiving the spherical surface of said first member, a split bushing disposed between said spherical seat and said ball member, a resilient stop member fixed to said housing member and having a free end thereof disposed in said split whereby said resilient stop makes sliding engagement with said spherical surface as said members are rotated relative to each other and moves partially out of said split as said relieved portions move thereover to engage said rib to limit rotation of said members relative to each other.

10. A swivel according to claim 9 wherein said bushing and said housing member are provided with interengaged means to lock the same against relative rotation.

References Cited in the file of this patent

UNITED STATES PATENTS

| | | |
|---|---|---|
| 675,106 | Oberle | May 28, 1901 |
| 1,290,830 | De Fungo | Jan. 7, 1919 |
| 2,031,878 | Coutu | Feb. 25, 1936 |
| 2,699,342 | May | Jan. 11, 1955 |
| 2,799,518 | LeRoy | July 16, 1957 |
| 2,910,310 | Mulac | Oct. 27, 1959 |